Nov. 23, 1965     T. P. STAFFORD     3,219,036
INTRAVENOUS CATHETER APPARATUS
Filed March 25, 1963
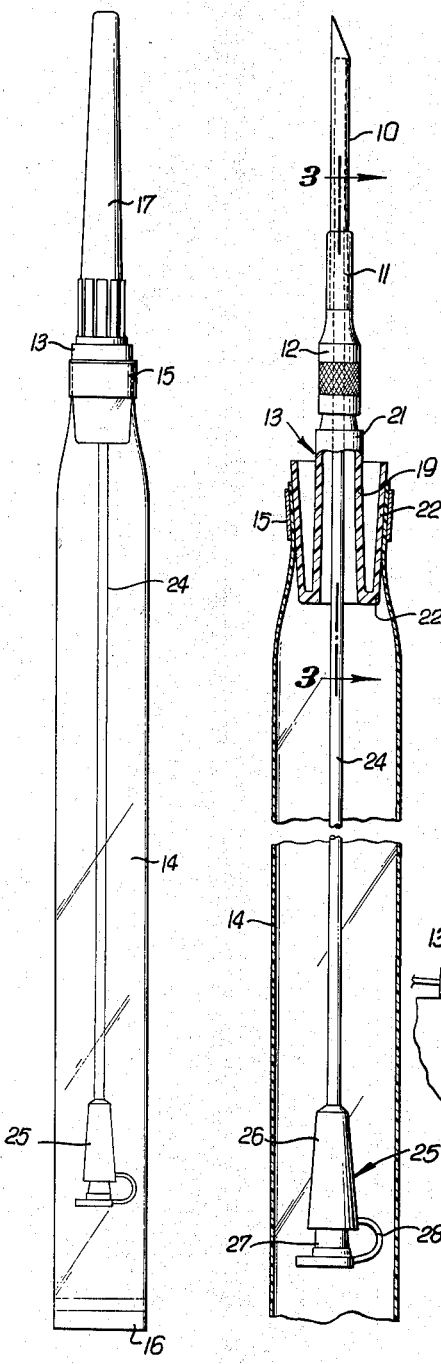
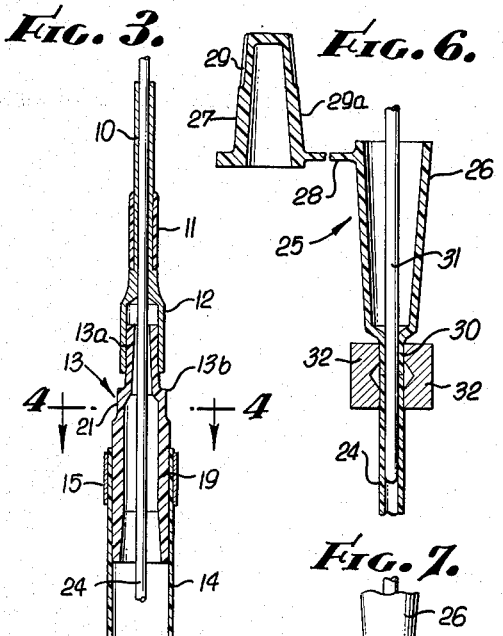
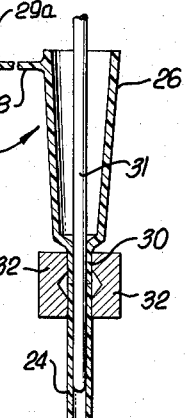
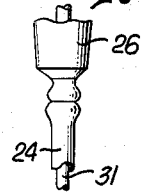
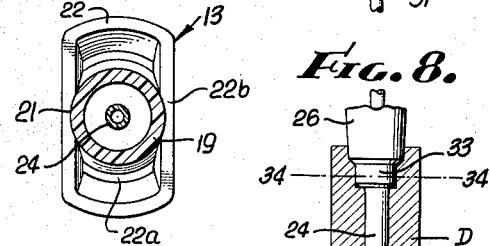
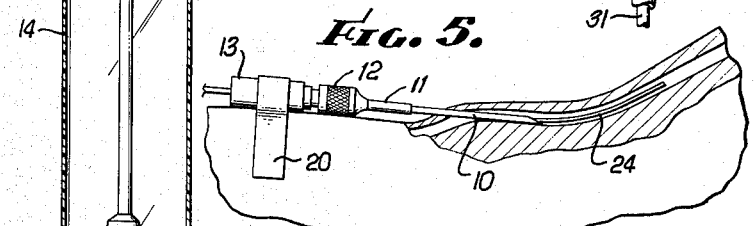
INVENTOR.
THOMAS P. STAFFORD
BY
White & Haefliger
ATTORNEYS.

United States Patent Office 3,219,036
Patented Nov. 23, 1965

3,219,036
INTRAVENOUS CATHETER APPARATUS
Thomas P. Stafford, Glendale, Calif., assignor to Don Baxter, Inc., Glendale, Calif., a corporation of Nevada
Filed Mar. 25, 1963, Ser. No. 267,672
10 Claims. (Cl. 128—214)

This invention has to do with improvements in intravenous catheters insertable into the vein of a patient, and of which there are various types employing a small flexible catheter tube insertable into a vein independently of any needle association, as in a cutdown catheter, or by insertion through or alongside a tubular needle. In certain more specific aspects the invention relates to sterile packaged apparatus of this character, in which a needle-accommodated catheter tube extends through an adapter about which is secured a removable flexible bag wherein the catheter terminal is joined to an enlarged diameter connector. The latter, upon removal of the bag, is attachable to a source of liquid for injection into the vein.

The invention is primarily concerned with the terminal connector and its mode of association with the catheter tube. For accomplishment of its objectives, the invention contemplates making the tube and connector of flexible plastic material or materials having fusion compatability, and desirably of the same plastic which preferably is polyethylene.

The invention has the important objective of effecting integrated association of the catheter and connector coupling in a manner precluding any possibility of leakage that could result in bacterial contamination into the patient's bloodstream, while assuring a joint or juncture strength and internal openness comparable to those of the catheter tube. Briefly, this objective is accomplished in a manner excluding reliance upon any type of connection to be inaccessibly effected inside the coupling, by a fused juncture of the tube with an outer reduced end portion of the coupling. By simultaneously heating terminal extents of the coupling and tube, and by bringing the resulting fusions together in the manner later explained it is possible to achieve an integrated completely fluid tight juncture having ideally suitable qualities of assured continued sterility, strength and openness.

The invention further contemplates providing the plastic connector so joined to the catheter tube, with a so-called "captive" plug formed integrally with the coupling so as to be insertable in and removable therefrom. Since in the initial packaged condition of the catheter, the connector and plug are inaccessible except to the extent of manipulation through the plastic bag, integration of the plug with the catheter presents the advantage of precluding separation of the plug in the bag with consequent difficulties of restoring the plug without opening the bag and losing sterilization.

The invention has additional features such as a novel form and structure of adapter especially suited for application to the patient, all of which together with the features and objects first mentioned, will be more fully understood from the following detailed description of an illustrative embodiment shown by the accompanying drawing in which:

FIG. 1 is a view showing the apparatus in longitudinal elevation;

FIG. 2 is a fragmentary showing similar to FIG. 1 with the needle protector cap removed and the flexible bag appearing in section;

FIG. 3 is a fragmentary sectional enlargement showing the needle association with the adapter and catheter tube;

FIG. 4 is an enlarged cross section on line 4—4 of FIG. 3;

FIG. 5 is a view showing the needle and catheter inserted in a vein;

FIG. 6 is a sectional enlargement illustrating the method of joining the connector to the catheter tube; and FIGS. 7 and 8 are views illustrating successive stages in effecting the tube-connector fused junction.

The apparatus is shown to comprise a conventional tubular needle 10 and which may or may not carry a plastic sleeve 11 for engagement by holding tape, the needle shank having the usual connector 12 for attachment to the reduced end 13a of an adapter 13. The latter, in turn, is retained within one end of a thin transparent plastic bag 14 as by band of tape 15 applied to the bag neck about the adapter, the opposite end 16 of the bag having a closure seal. The needle is receivable within a removable protector 17 fitted to the hub 13b of the adapter.

In particular reference to FIGS. 3 and 4, the adapter outer portion 22 to which the bag is applied, is shown to be of generally rectangular cross section affording flattened sides which permit the adapter to be more conveniently and securely held to the patient, as in accordance with FIG. 5 where the flat side of the adapter is shown to be held to the patient by tape 20. The adapter has a tubular inner portion 19 integrated with an outer portion 22 of rectangular cross section with tapering opposite sides as viewed in FIG. 2. The walls of the outer portion 22 merge at 22a with the end of the inner portion 19 and at 22b with the sides thereof, the wall thicknesses of the two portions being substantially uniform and reduced, consistent with adequate strength, to have desirable lightness and to require minimal plastic free from "sinks" in being molded. Tape 15 applied to the bag holds the latter to the adapter during normal handling. The taper given the outer portion 22 however permits the taped bag neck to be conveniently slipped off at the time of catheter usage.

The small diameter flexible catheter tube 24 is received at one end within the needle 10 and extends within the bag 14 to a terminal connector assembly generally indicated at 25. Both the tube and connector are made of plastic material or materials capable of fusion together, and typically both may be made of polyethylene. The connector assembly is shown to comprise a tapered tubular body 26 having what may be termed a "captive" tapered plug 27 integrated with the body by a flexible connector web 28, the plug being hollow and therefore having desirable flexibility for sealing in the body 26. The plug is externally ribbed or grooved at 29 throughout a portion of its length so that when partially inserted into the connector body 26, the catheter tube may be vented through the clearances afforded by the plug recesses or grooves. When inserted further to bring the unribbed surface 29a into the body, the plug forms a fluid-tight closure.

The invention is importantly concerned with the mode of attachment of the catheter tube 24 to the connector body 26, in the manner particularly illustrated in FIGS. 6 to 8. In forming the juncture, the separate tube 24 is brought into abutting relation with a short extension 30 on the reduced end of the connector body, approximating in wall thickness and diameter the tube 24. It is found desirable for the extension 30 length to be between about 1/16 inch and 1/8 inch, which during formation of the fused joint is sufficiently long to prevent excessive chilling of the fused tube terminal by contact with the larger connector body, and sufficiently short to minimize formation of loose flash across the end face of the connector. The parts are maintained in end to end relation by a mandrel 31 inserted through the connector into the tube. By bringing sections 32 of an electrical heating element about the tube terminal and extension 30 while they are brought together the major portion of the extension and the end of the tube melt to an integrally fusable state, following which the heating element is removed and, while the melted ends are pushed together, see FIGS. 7-8, a cylindrical die D is advanced about the tube to displace the soft plastic toward the end of the connector and form adjacent thereto an integrated fillet 33 having a diameter slightly larger than that of the tube 24. Thus the resulting joint at 33 has at least the strength of the tube and its internal openness, as well as assured continuity against leakage. Although the joint 33 is an integrated fused plastic mass, the weld in effect will occur at a location approximated by line 34—34 beyond the end surface of the connector body 26.

As packaged, the internal parts of the apparatus may be sterilized and maintained in sterile condition within the confinement of the bag 14. It may be particularly noted that retention of the plug 27 captively to the connector body 26 in the bag, precludes separation and such displacement of the plug therein as would render inconvenient restoration of the plug while the parts remain in the bag.

When the apparatus is prepared for use, the protector 17 is removed, following which the needle may be inserted in the patient's vein 34 as shown in FIG. 5. The catheter is then projected through the needle into the vein by grasping catheter 24, or connector 25, through the walls of the bag 14 and urging it toward needle connector 12. Blood is then allowed to fill catheter 24 and connector 25. When blood appears in connector 25, plug 27 is pressed into sealing relation with connector body 26 so as to prevent further flow of blood. Bag 14 may then be removed from outer portion 22 of the adapter and terminal connector 25 with a tapered external surface wedged into a tapered bore of inner portion 19 of the adapter. Plug 27 may then be removed from connector body 26 and the latter coupled to a supply source for blood or other liquid to be injected into the vein.

Complete protection against bacterial contamination as sometimes occurs because of faulty catheter-connector association, is precluded by the strong integrated and leakage-proof juncture resulting from the fusion at 33.

I claim:
1. An intravenous medical catheter comprising:
 (a) an elongated flexible plastic tube with an open bore extending between first and second ends thereof;
 (b) a connector which includes a body portion larger than said flexible plastic tube, which body portion has a passage therethrough adapted to connect to a fluid supply source and a tubular extension integral with and extending from one end of the body portion to an outer end which abuts and is sealed to the second end of said flexible plastic tube; and
 (c) a fillet formed of a mass of displaced plastic material, said fillet extending along the tubular connector extension and a portion of the second end of the flexible plastic tube to form a section of wall having a thickness greater than that of the flexible tube and a joint having at least the strength of the flexible tube itself and increased assurance of continuity against leakage.

2. An intravenous medical catheter as set forth in claim 1 wherein said connector has a plug integrally connected to said body portion by a flexible web, said plug adapted to close off the passage through said body portion when said passage is not connected to a fluid supply source.

3. An intravenous medical catheter as set forth in claim 1 wherein said plug includes passage means to admit sterilizing gases into the connector when said plug is partially inserted into said connector, which plug is adapted to completely close off said passage means when fully inserted into said connector.

4. An intravenous medical catheter as set forth in claim 3 wherein said passage means is formed by a rib extending partially along the length of said plug.

5. An intravenous medical catheter as set forth in claim 3 wherein said passage means to admit sterilizing gases includes grooves extending partially along the length of said plug.

6. An intravenous medical catheter as set forth in claim 1 wherein the tubular connector extension extends one-sixteenth to one-eighth inch from the body portion of the connector.

7. A catheter apparatus for intravenous use comprising:
 (a) an adapter which includes a tubular inner portion with a longitudinal passage therethrough, and an outer portion surrounding and spaced from said tubular inner portion and integrally connected thereto;
 (b) a hollow hypodermic needle fitted to said tubular inner portion and extending outwardly therefrom;
 (c) a removable sterile protector encasing said hypodermic needle prior to insertion of the needle in the patient's vein;
 (d) an elongated flexible bag having an open mouth at one end and a closed opposite end, a portion of the flexible bag adjacent the open mouth fitting over and removably secured to the outer portion of said adapter, said flexible bag extending from said adapter in a direction opposite that of said needle; and
 (e) an intravenous catheter including
  (1) an elongated flexible plastic tube with an open bore extending between first and second ends thereof,
  (2) a connector which includes a body portion larger than said flexible plastic tube, which body portion has a tapered pasage therethrough adapted to connect to a fluid supply source and a tubular extension integral with and extending from one end of the body portion to an outer end which abuts and is sealed to the second end of said flexible plastic tube, and
  (3) a fillet having a diameter slightly larger than said flexible tube and being formed of a mass of displaced plastic material, said fillet encircling the tubular connector extension and a portion of the second end of said elongated flexible plastic tube to form a joint having at least the strength of the flexible tube itself and increased assurance of continuity against leakage, a portion of the flexible tube longitudinally disposed within connecting bores of said hollow hypodermic needle and the inner portion of said adapter, the connector and remaining portions of the flexible tube extending into the flexible bag and encased therein.

8. A catheter apparatus as set forth in claim 7 wherein the outer portion of the adapter has a generally rectangular cross-section that tapers inwardly toward the end of the adapter from which the flexible bag extends, so as to facilitate convenient removal of the bag from the adapter with one hand.

9. A catheter apparatus as set forth in claim 8 wherein the portion of the flexible bag adjacent its mouth has a tape strip adhesively secured thereto and encircling said portion.

10. An intravenous catheter and package apparatus comprising:
 (a) an adapter having a generally rectangular outer shape having a generally rectangular outer shape with a perimeter that progressively decreases in size toward one end, a tubular portion extending from the opposite end, and a longitudinal passage therethrough;
 (b) a hollow hypodermic needle fitted to said tubular portion and extending therefrom;
 (c) a removable sterile protector encasing said hypodermic needle;
 (d) an elongated flexible bag having an open mouth at one end and a closed opposite end, a portion of the flexible bag adjacent the open mouth fitting over the small end of the adapter and removably secured to the outer surface thereof so as to facilitate convenient removal of the bag from the adapter with one hand; and
(e) an intravenous catheter including
   (1) an elongated flexible plastic tube with an open bore extending between first and second ends thereof,
   (2) a connector which includes a body portion larger than said flexible plastic tube with a tubular extension extending from one end of the body portion to an outer end which abuts and is sealed to the second end of said flexible plastic tube, which body portion has a tapered passage which communicates with the bore of the flexible tube and is adapted to connect a fluid supply source to the bore of said flexible tube,
   (3) a fillet of a mass of displaced plastic material fused to the connector body and to said elongated flexible plastic tube adjacent its second end forming a joint therebetween having at least the strength of the elongated flexible plastic tube itself, and
   (4) a portion of the flexible tube longitudinally disposed within connecting bores of said hollow hypodermic needle and the tubular portion of said adapter, the connector and remaining portions of the flexible tube extending into the flexible bag and encased therein.

References Cited by the Examiner

UNITED STATES PATENTS

| | | | |
|---|---|---|---|
| 2,896,629 | 7/1959 | Warr | 128—349 |
| 2,915,063 | 12/1959 | Cutter | 128—214 |
| 2,963,394 | 12/1960 | Wilkinson | 156—304 |
| 3,010,453 | 11/1961 | Doherty | 128—214 |
| 3,022,209 | 2/1962 | Campbell | 156—158 |
| 3,055,361 | 9/1962 | Ballard | 128—214 |
| 3,058,472 | 10/1962 | Thornton | 128—348 |
| 3,064,653 | 11/1962 | Coanda | 128—348 |

FOREIGN PATENTS

| | | | |
|---|---|---|---|
| 72,395 | 5/1953 | Hatschek | 264—249 |

RICHARD A. GAUDET, *Primary Examiner.*

JORDAN FRANKLIN, *Examiner.*

UNITED STATES PATENT OFFICE
CERTIFICATE OF CORRECTION

Patent No. 3,219,036                  November 23, 1965

Thomas P. Stafford

It is hereby certified that error appears in the above numbered patent requiring correction and that the said Letters Patent should read as corrected below.

Column 4, lines 63 and 64, strike out "having a generally rectangular outer shape having a generally rectangular outer shape".

Signed and sealed this 27th day of September 1966.

(SEAL)
Attest:

ERNEST W. SWIDER                  EDWARD J. BRENNER
Attesting Officer                     Commissioner of Patents